May 10, 1938.    J. L. FAIRRIE    2,117,156
MOLDING MACHINE
Filed Feb. 24, 1936    3 Sheets-Sheet 1
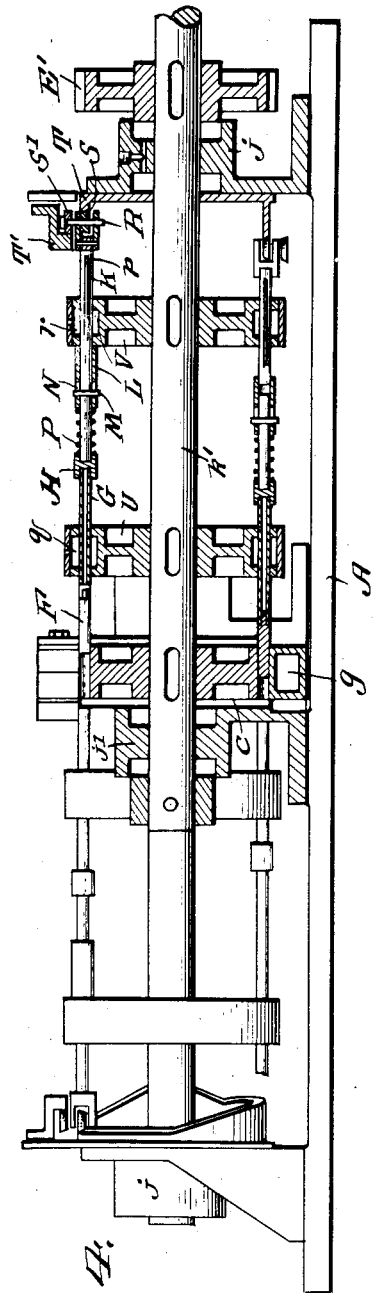
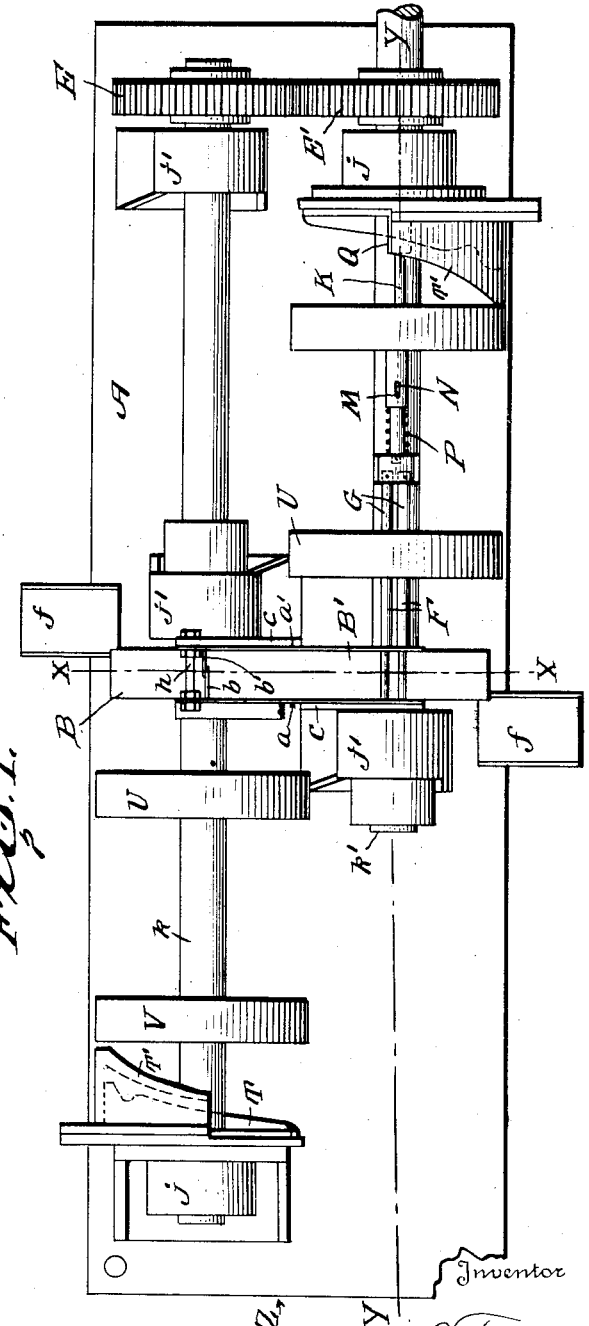
Inventor
James L. Fairrie
By Mason & Porter
Attorneys May 10, 1938.   J. L. FAIRRIE   2,117,156
MOLDING MACHINE
Filed Feb. 24, 1936   3 Sheets-Sheet 2
Fig. 3.
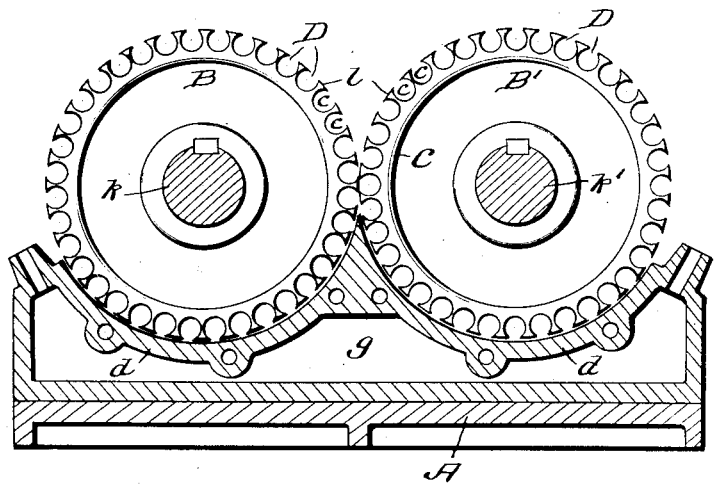
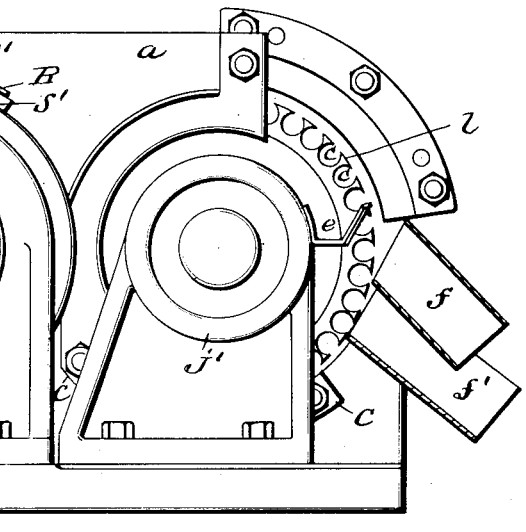
Fig. 2.
Inventor
James L. Fairrie
By Mason & Porter
Attorneys May 10, 1938.  J. L. FAIRRIE  2,117,156
MOLDING MACHINE
Filed Feb. 24, 1936

Inventor
James L. Fairrie
By Mason & Porter
Attorneys

Patented May 10, 1938

2,117,156

UNITED STATES PATENT OFFICE 2,117,156

MOLDING MACHINE

James Leslie Fairrie, London, England

Application February 24, 1936, Serial No. 65,463
In Great Britain February 26, 1935

10 Claims. (Cl. 107—8)

This invention relates to an improved molding machine for ground material, and it is particularly designed for use with a mixture of molasses and ground dried beet pulp; the ground pulp is preferably of graded particle size so that the compressed mixture contains a minimum of voids.

This material easily packs tight and one of the objects of the invention is to provide a process by which it is possible to avoid compressing the material against dead surfaces other than those of the molds themselves. Another object of the invention is to provide a machine in which agglomerable material can be continuously compressed into molded cylinders and discharged from the machine with little danger of choking the molds. Further objects will be apparent from the following description.

These objects can be attained by providing a series of molding spaces adapted to be filled through comparatively large apertures, at relatively low pressure, which apertures are then closed, after which pressure is applied individually to each molding space through another opening at right angles to the first, preferably acting against a compression plate which closes the other end of the opening until the desired compression has been obtained. These molding spaces preferably consist of open-sided cylindrical depressions formed on the periphery of a comparatively large cylinder.

In a preferred form of the invention, a large metallic cylinder is drilled near the periphery with cylindrical holes parallel with the axis. For example, these holes may be ⅝" (five eighths) diameter, centres ¾" apart. The external part of the cylinder is then turned away so as to expose approximately cylindrical depressions with a chordal opening of ⅜" separated by solid portions of the same width. Two such cylinders can then be geared together and caused to rotate in mutual engagement, with their axes horizontal so that the solid portions of the periphery of one cylinder will engage the open spaces of the periphery of the other cylinder; when the material is fed vertically downwards into the intervening space between the two cylinders the approximately cylindrical grooves will thus be charged. Further rotation causes the chordal opening in each rotating cylinder to be closed by the stationary segment of a co-axial cylinder.

At one end of each cylinder there is provided a compression plate which prevents expulsion of the material, whilst at the other end of each cylinder each groove is provided with a plunger or ram adapted to be actuated in a direction parallel with the axis of the cylinder by means of a cam. This cam may be so arranged that the travel of the compression plungers may be adjusted in a simple manner.

Compression springs or other devices may be employed to control the maximum pressure irrespective of the amount of substance in the mold.

After molding, and expression by the plungers the squeezed material may be detached by means of a stationary plate or knife.

The compression and expulsion plungers may be operated by a cam or cams as described or by pneumatic, hydraulic or other means.

Means may be employed for heating the cylindrical members and/or their co-axial closing segments to any necessary extent.

It will be seen that by the above-described apparatus two cylindrical members rotate in opposite directions, so as to charge the material into peripheral grooves in which it is further compressed and then expelled by plungers acting axially along said grooves, and from which egress through the chordal openings is prevented by closure of these chordal openings during the rotational passage through the requisite arc or angle.

Having thus broadly stated the objects and nature of my said invention I will now proceed to give a full description of it and in so doing will refer to the accompanying illustrative drawings in which Fig. 1 is a plan view of a molding machine in accordance with my invention, on which the centre lines of the compressing plungers or rams and of their operating rods or tubes are shown in the front half, and on which are also shown one pair of plungers or rams and the single rod or tube operating these and terminating in a pair of cam rollers.

Fig. 2 is an end elevation in the direction of the arrow Z on Fig. 1.

Fig. 3 is a cross-sectional elevation at line XX Fig. 1 through the mold cylinders or rotors.

Fig. 4 is a longitudinal sectional elevation through the line YY on Fig. 1.

Figure 5:
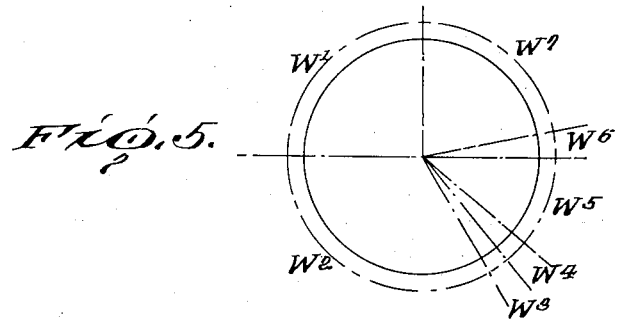
Fig. 5 shows a typical cycle of the operations of the plungers during one revolution of the machine.

Referring to the drawings A represents the bed-plate or base of the machine, B and B1 the two mold cylinders or rotors containing the mold spaces C which are filled through the apertures D, E and E1 are two similar and equal gear wheels whose pitch circle is slightly larger than the diameter of the molding cylinders, or rotors so as to permit a slight clearance between these at their horizontal axis when the shafts bearing these mold cylinders or rotors and the gear wheels are set up.

The plungers or rams F move freely in the mold spaces C and have a similar cross-section, they are preferably made from a material such as Celoron whose heat conductivity is comparatively low; they are rigidly attached to the plunger rods or ram-rods G which terminate in a cross head H to which in turn is rigidly attached a circular stem piece J. Surrounding the stem piece J and the operating rod or tube K is a cylindrical sleeve L which is rigidly attached to the operating rod or tube K but is free to slide horizontally within the limits prescribed by the pin M which is rigidly attached to the stem piece J. Each end of the pin M projects beyond the stem piece J and engages in a slot M in the cylindrical sleeve L. Between the cross head H and the cylindrical sleeve L there is a loaded helical spring P.

The operating rod or tube K terminates in a fork-end Q bearing a centre pin R about which the cam rollers S and S1 are free to rotate. Cam rollers S are operated by the stationary cam T whose contour is such that the plungers or rams F are caused to advance in the mold spaces C. During rotation cam rollers S1 engage with the stationary cam T1 whose contour is such that the plungers or rams F are caused to withdraw from the mold spaces C after they have advanced to the limit of their travel.

Each pair of plungers or rams F, their cross head N, and the attached stem piece J are compelled to move in proper alignment with the apertures D by the cylindrical guide surfaces in the guide ring U. Guide ring V performs a similar function in respect of the operating rods or tubes K.

The plates a, a1, b, and b1 form a small hopper into which the material to be compressed and molded is fed. As the mold cylinders or rotors B and B1 rotate in the direction of the arrows, the mold spaces C are charged, and as each mold space comes on to the horizontal centre line its plunger or ram F advances and commences compressing the charge of material against the compression plate c, egress of the charge through aperture D being prevented by the cylindrical face of the housing d.

The compressed charges are eventually detached from the ends of the plungers or rams F by the detaching knife e at the moment when the ends of these plungers or rams F have reached the full extent of their travel and when their extreme ends are in line with the outer face of the mold cylinder or rotor B or B1. The force required to detach the compressed charges from the ends of the plungers or rams F is not large and has merely to overcome adhesion. After detachment the compressed charges are caught by chute f or in such case where detachment may take place before contact with the detaching knife e by chute f or alternatively by chute f1.

In order to prevent too rapid loss of heat from the hot material to be compressed, the housing d is made hollow so as to permit the presence of a hot liquid such as a suitable oil into the heating space g, or another heating medium may be employed.

Between the housing d and the bed-plate or base A of the machine a sheet h of suitable heat insulating material is interposed. The bearings j and j1 carry the shafts k and k1. To the casings of the bearings j the stationary composite cams T and T1 are rigidly attached.

As the mold cylinders or rotors B and B1 rotate in the direction of the arrows the compressible material fed into the space enclosed by the hopper plates a and a1, b and b1 enters the mold space C through the apertures D.

In mold cylinder or rotor B the material is packed into the mold spaces C by the solid portions l of the periphery of mold cylinder or rotor B1 and vice versa. The length of the mold space C exposed to the material to be compressed is regulatable by bringing plate a more or less adjacent to plate a1. The lower surface of plate a carries a flange or masking plate m which covers the portions of the mold spaces C projecting externally beyond the line of plate a. The flanges or masking plates m conform in contour with the periphery of mold cylinder or rotor B or B1. The plate studs n carry plates a, and a1, the requisite adjustment being made by means of the nuts on the screwed ends of plate studs n. In order to permit the adjustment of the position of plate a along the plate studs n the side plates b and b1 rigidly attached to the end plates a and a1 respectively are so fixed that their overlapping surfaces may slide but remain in close contact.

The cam rollers S and S1 are maintained in proper relationship with the cams T and T1 by the keys p in the operating rods or tubes K, each of which keys slides in its appropriate key-way in guide ring V.

Lubrication of the sliding surfaces of the plunger rods or ram-rods G in guide ring U is achieved by charging the lubricating space q with a suitable lubricant. In guide ring V there is a similar lubricating space r for the operating rods or tubes K.

Each spring P is permanently compressed between cross head H and cylindrical sleeve L to such an extent that the load upon it is equal to twice the maximum pressure against which each of the two operating plungers or rams F attached to the same cross head H has to work. So long as the material to be compressed in each mold space C remains constant in respect of its predetermined physical characteristics and so long as the weight packed into each of the mold spaces C before compression takes place also remains constant, the springs P are not required to function. If through alterations in the physical characteristics of the material to be compressed or in the weight of it packed into the mold spaces C the finally compressed charge occupies a larger volume than the normal, such increase in volume is permitted by further compression of the initially compressed springs P. The latitude of the stroke of the plungers or rams F, during compression of the charge permitted by the springs P also provides security in the case of the introduction of foreign matter into the mold spaces C.

The size of the charge of material packed into each mold space C may be varied by appropriate adjustment of hopper side plate a, and the consequent alteration in the length of the aperture C exposed to the material. This same adjustment of hopper plate a, also applies where the speed of rotation is changed when more or less output per unit time is required or for any other reason.

A further adjustment in the size of the charge of material packed into each mold space C may be made by varying the depth of the material in the hopper formed by the plates $a$, $a1$, $b$, $b1$, so that the top of this material varies in vertical relationship to the horizontal surface formed by horizontal lines joining and tangential to the peripheries of the mold cylinders B and B1.

The material to be compressed is led into the hopper formed by the plates $a$, $a1$, $b$, $b1$ at the desired rate by means of an adjustable feed device of known form; for instance, a short section of a helical conveyor may be driven through an infinitely variable speed gear. The axis of the helix is preferably vertical but it may be horizontal or at any angle between the vertical and the horizontal.

The mode of operation of the machine is, with reference to Fig. 5, as follows:—

During the angle of rotation W1 the material is fed and packed into mold spaces C.

During the angle of rotation W2 the material is compressed by the plungers or rams F, egress from the mold spaces C being prevented by compression plate $c$ and housing $d$.

During the angle of rotation W3 the plungers F are stationary in the mold spaces C and maintain the material in a compressed state.

During the angle of rotation W4 the plungers or rams F are slightly retired and thus permit the compressed material to expand to its final form. At this stage the internal stresses in the material have become approximately constant and to this extent the plungers F and the compression plate $c$ are relieved of compression stresses.

During the angle of rotation W5 the plungers or rams F are advanced to their full travel and the compressed charges are expelled.

During the angle of rotation W6 the compressed charges are detached from the ends of the plungers or rams F and leave the machine down the chutes $f$ or $f1$.

During the angle of rotation W7 the plungers or rams F are withdrawn so that the mold spaces C are again free to receive a charge when a fresh cycle commences.

The angles given for each operation in Fig. 5 are typical only. I may, for instance, decrease the stationary filling period to 60° and utilize the 30° from the vertical axis thus provided to increase any of the periods W2 to W7, it being understood that the point of detachment may then be varied.

Figure 6:
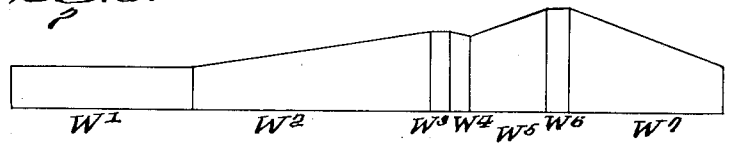
Fig. 6 shows a typical contour of the composite cam operating the plungers or rams and set out in linear form in place of circular form as it is on the actual cam.
Figure 7:
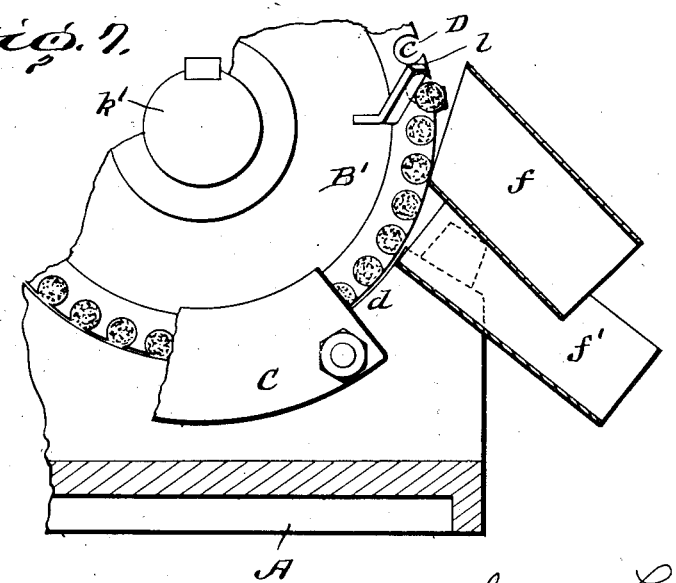
Fig. 7 shows the expelling and detaching of the compressed charges.

Figure 6 shows a cam contour which has been found suitable for the compression of charges of approximately 8 grams of one mixture of ground dried sugar beet pulp, two parts by weight, and beet molasses 75° Brix one part by weight, under a pressure reaching 350 lbs. per square inch and at a temperature between 80° and 90° centigrade, when the length of compressed material was found to be approximately 1⅛ inches to which it expanded after being compressed to a length of 1″. The diameter of the mold cylinders or rotors was 10″, their face width was 2½″, the diameter of the mold spaces C was ¾″; there were 36 mold spaces to each mold cylinder or rotor, formed by drilling holes ¾″ diameter equally spaced round a pitch circle of 9⁷⁄₁₆″ diameter so that each chordal opening and each solid portion of the periphery were approximately ⁷⁄₁₆″ wide.

The mold cylinders or rotors were rotated at the rate of 45 R. P. M.

I claim as my invention:—

1. Apparatus for molding agglomerable material comprising a pair of rotatable cylindrical members in contiguous relationship, at least one of which has circumferentially spaced longitudinal mold spaces on its periphery, with the mold spaces of one cylindrical member opposite the cylindrical surface of the other member at the bight between the two, means for rotating said cylindrical members in opposite directions, a hopper for feeding the agglomerable material towards the bight and into the chordal openings of said mold spaces, compression rams each of which is displaceable longitudinally with a sliding fit within a mold space when its chordal aperture is closed, over a cross-sectional area which is less than the area of the chordal aperture, and means to reciprocate said rams.

2. Apparatus for molding agglomerable material comprising a pair of rotatable cylindrical members in contiguous relationship, both of which have circumferentially spaced longitudinal mold spaces on their peripheries with the mold spaces of one cylindrical member between successive mold spaces on the periphery of the other cylindrical member at the bight between the two, means for rotating said cylindrical members in opposite directions, a hopper for feeding the agglomerable material towards the bight and into the chordal apertures of said mold spaces, compression rams each of which is a sliding fit in a mold space and, when said chordal aperture of said space is closed, is displaceable longitudinally of said space over a cross sectional area which is materially smaller than the area of said chordal aperture, and cam operated means to reciprocate said rams.

3. Apparatus for molding agglomerable material comprising a pair of rotatable cylindrical members in contiguous relationship, at least one of which has circumferentially spaced longitudinal mold spaces on its periphery with the mold spaces of one cylindrical member opposite the cylindrical surface of the other cylindrical member at the bight between the two, means for rotating said cylindrical members in opposite directions, a hopper for feeding the agglomerable material towards the bight and into the chordal apertures of said mold spaces, means for closing each chordal aperture and one end of each mold space during their rotation beyond the bight, compression rams each of which has a sliding fit in a mold space and is displaceable longitudinally therein over a cross sectional area which is materially smaller than the area of said chordal aperture to compress said material in said mold space when its chordal aperture and one end is closed, and to discharge said material axially when said end is opened, and cam operated means to reciprocate said rams.

4. Apparatus for molding agglomerable material comprising a pair of rotatable cylindrical members in contiguous relationship, both of which have circumferentially spaced longitudinal mold spaces on their peripheries with the mold spaces of one cylindrical member between successive mold spaces on the periphery of the other cylindrical member at the bight between the two, means for rotating said cylindrical members in opposite directions, a hopper for feeding the agglomerable material towards the bight and into the chordal apertures of said mold spaces with a relatively low pressure, a stationary concave arcuate housing for closing each chordal aperture during rotation beyond the bight, a compression end plate extending over a portion of the circumferential path of travel of the mold spaces beyond the bight, compression rams equal in number to said mold spaces and each being a sliding fit in its mold space and longitudinally displaceable therein over a cross sectional area which is less than the area of said chordal aperture to apply a relatively high compression on said material when the chordal aperture and one end of said mold space are closed and to discharge said material axially when said mold space end is opened and cam operated means to reciprocate said rams.

5. Apparatus for molding agglomerable material comprising a pair of rotatable cylindrical members in contiguous relationship, at least one of which has circumferentially spaced longitudinal mold spaces on its periphery with the mold spaces of one cylindrical member opposite the cylindrical surface of the other cylindrical member at the bight between the two, means for rotating said cylindrical members in opposite directions, a hopper for feeding the agglomerable material towards the bight and into the chordal apertures of said mold spaces with a relatively low pressure, compression rams equal in number to said mold spaces and each of which is a sliding fit in a mold space and displaceable in the manner of a piston to apply a relatively high pressure on the material longitudinally within a mold space, when its chordal aperture is closed, over a cross sectional area which is less than the area of said chordal aperture, crossheads by which said rams are interconnected for displacement in groups with at least two rams to each group, and cam operated means to reciprocate said crossheads and said rams.

6. Apparatus for molding agglomerable material comprising a pair of rotatable cylindrical members in contiguous relationship, both of which have circumferentially spaced longitudinal mold spaces on their peripheries with the mold spaces of one cylindrical member between successive mold spaces on the periphery of the other cylindrical member at the bight between the two, means for rotating said cylindrical members in opposite directions, a hopper for feeding the agglomerable material towards the bight and into the chordal apertures of said mold spaces with a relatively low pressure, a stationary concave arcuate housing for closing each chordal aperture during rotation beyond the bight, a compression end plate extending over a portion of the circumferential path of travel of the mold spaces beyond the bight, compression rams equal in number to said mold spaces and each being a sliding fit in its mold space and longitudinally displaceable therein over a cross sectional area which is less than the area of said chordal aperture to apply a relatively high compression on said material when the chordal aperture and one end of said mold space are closed and to discharge said material axially when said mold space end is opened and cam operated means for displacing said rams axially of said mold spaces and for permitting slight retraction at the end of their compression strokes when said end is closed and for advancing said rams when said end is open to discharge said compressed material.

7. Apparatus for molding agglomerable material comprising a pair of rotatable cylindrical members in contiguous relationship, at least one of which has circumferentially spaced longitudinal mold spaces on its periphery with the mold spaces of one cylindrical member opposite the cylindrical surface of the other cylindrical member at the bight between the two, means for rotating said cylindrical members in opposite directions, a hopper for feeding the agglomerable material towards the bight and into the chordal apertures of said mold spaces with a relatively low pressure, means for adjusting the width of said hopper to vary the length of the chordal apertures available to the feed of material, means to close said chordal aperture and one end of said mold space during rotation beyond the bight, compression rams equal in number to said mold spaces and each of which is a sliding fit in a mold space and longitudinally displaceable within said mold space when its chordal aperture is closed over a cross sectional area which is less than the area of said chordal aperture to apply a relatively high compression on said material when said chordal aperture and one end of said mold space is closed and cam operated means to reciprocate said rams.

8. Apparatus for molding agglomerable material comprising a pair of rotatable cylindrical members in contiguous relationship, at least one of which has circumferentially spaced longitudinal mold spaces on its periphery with the mold spaces of one cylindrical member opposite the cylindrical surface of the other cylindrical member at the bight between the two, means for rotating said cylindrical members in opposite directions, a hopper for feeding the agglomerable material towards the bight and into the chordal apertures of said mold spaces with a relatively low pressure, compression rams equal in number to said mold spaces and each of which is a sliding fit in a mold space and displaceable in the manner of a piston to apply a relatively high pressure on the material longitudinally within a mold space, when its chordal aperture is closed, over a cross sectional area which is less than the area of said chordal aperture, crossheads by which said rams are interconnected for displacement in groups with at least two rams to each group, rods carrying said plungers, rollers carried by said rods, cams engaging said rollers for displacing said rollers said rods and said rams in unison in parallel straight lines, and means for driving said cams.

9. Apparatus for molding agglomerable material comprising a pair of rotatable cylindrical members in contiguous relationship, at least one of which has circumferentially spaced longitudinal mold spaces on its periphery with the mold spaces of one cylindrical member opposite the cylindrical surface of the other cylindrical member at the bight between the two, means for rotating said cylindrical members in opposite directions, a hopper for feeding the agglomerable material towards the bight and into the chordal apertures of said mold spaces with a relatively low pressure, compression rams equal in number to said mold spaces and each of which is a sliding fit in a mold space and displaceable in the manner of a piston to apply a relatively high pressure on the material longitudinally within a mold space, when its chordal aperture is closed, over a cross sectional area which is less than the area of said chordal aperture, crossheads by which said rams are interconnected for displacement in groups with at least two rams to each group, resilient means on said rods for permitting variation of pressure exerted by said rams during compression, and cam operated means to reciprocate said crossheads and said rams.

10. Apparatus for molding agglomerable material comprising a pair of rotatable cylindrical members in contiguous relationship, both of which have circumferentially spaced undercut longitudinal mold spaces on their peripheries with the chordal apertures of the mold spaces of one cylindrical member opposite the arcs between successive mold spaces of the other cylindrical member at the bight between the two and approximately equal to the lengths of said arcs, means for rotating said cylindrical members in opposite directions, a hopper for feeding the agglomerable material towards the bight and into the chordal apertures of said mold spaces with a relatively low pressure, means to close said chordal apertures and one end of said mold spaces during rotation beyond the bight, compression rams equal in number to said mold spaces and each of which is a sliding fit in a mold space and displaceable to apply a relatively high pressure on the material therein in a direction longitudinally within said mold space when its chordal aperture is closed and over a cross sectional area which is less than the area of said chordal aperture, and cam operated means to reciprocate said rams.

JAMES LESLIE FAIRRIE.